United States Patent [19]
Berson

[11] Patent Number: 5,929,415
[45] Date of Patent: Jul. 27, 1999

[54] POSTAGE METERING REFILL SYSTEM THAT UTILIZES INFORMATION CONTAINED IN INFORMATION BASED INDICIA TO AUDIT THE FRANKING PROCESS

[75] Inventor: William Berson, Weston, Conn.

[73] Assignee: Pitney Bowes Inc., Stamford, Conn.

[21] Appl. No.: 08/848,036

[22] Filed: Apr. 28, 1997

[51] Int. Cl.⁶ .............................. G06K 7/10; G06K 5/00
[52] U.S. Cl. .................. 235/382; 235/462.01; 209/564
[58] Field of Search ............................. 235/382, 382.5, 235/375, 494, 383, 487, 486, 462.01; 209/564, 547

[56] References Cited

U.S. PATENT DOCUMENTS

| | | | |
|---|---|---|---|
| 3,596,247 | 7/1971 | Eckert, Jr. ............................... | 340/147 |
| 4,254,875 | 3/1981 | Emery ..................................... | 209/547 |
| 4,388,994 | 6/1983 | Kazuyoshi et al. ..................... | 209/564 |
| 4,743,747 | 5/1988 | Guy et al. ............................... | 235/494 |
| 4,802,218 | 1/1989 | Wright et al. ............................ | 380/23 |
| 4,864,618 | 9/1989 | Wright et al. ............................ | 380/51 |
| 4,900,903 | 2/1990 | Wright et al. .......................... | 235/380 |
| 4,900,904 | 2/1990 | Wright et al. .......................... | 235/381 |
| 5,249,687 | 10/1993 | Walter et al. .............................. | 209/3 |

*Primary Examiner*—Thien Minh Le
*Attorney, Agent, or Firm*—Ronald Reichman; Melvin J. Scolnick

[57] ABSTRACT

A system that scans and reads IBI in accordance with the USPS Specification. This invention also improves both the readability and security of the IBI. The apparatus of this invention utilizes a postage meter that prints an IBI, scans and checks the IBI and prints an invisible, secure message, i.e., bar code over the IBI. When, the mail piece arrives at the post, the additional material is scanned and read at the same time the IBI information is scanned and read. The scanned verification information is then collected and may be subsequently transmitted to a central data center and used for further verification of the postage paid. This stored information may be retrieved during connection to a central postage meter resetting data center when the meter is reloaded and forensically checked.

12 Claims, 3 Drawing Sheets

POSTAGE METERING REFILL SYSTEM THAT UTILIZES INFORMATION CONTAINED IN INFORMATION BASED INDICIA TO AUDIT THE FRANKING PROCESS

CROSS REFERENCE TO RELATED APPLICATIONS

Reference is made to commonly assigned copending patent application filed herewith entitled "A Postage Metering System That Utilizes Secure Invisible Bar Codes For Postal Verification" in the names of William Berson and Judith Auslander.

FIELD OF THE INVENTION

The invention relates generally to the field of franking machines and more particularly to the scanning and verification of indicia produced by franking machines and the transmission of the scanned information to a data center for further processing.

BACKGROUND OF THE INVENTION

Historically, postage meters have been mechanical and electromechanical devices that: maintain through mechanical or "electronic registers" (postal security devices) an account of all postage printed and the remaining balance of prepaid postage; and print postage postmarks (indicia) that are accepted by the postal service as evidence of the prepayment of postage.

Soon small business mailers may be able to use their desktop computer and printer to apply postage directly onto envelopes or labels while applying an address. The United States Postal Service Engineering Center recently published a notice of proposed specification that may accomplish the foregoing. The title of the specification is Information Based Indicia Program Postal Security Device Specification, dated Jun. 13, 1996. The Information Based Indicia Program specification includes both proposed specifications for the new indicium and proposed specifications for a postal security device (PSD). The proposed Information-Based Indicia (IBI) consists of a two dimensional bar code containing hundreds of bytes of information about the mail piece and certain human-readable information. The indicium includes a digital signature to preclude the forgery of indicia by unauthorized parties. The postal security device is a unique security device that provides a cryptographic digital signature to the indicum and performs the function of postage meter registers.

There are approximately one and a half million postage meters in use in the United States, accounting for about twenty billion dollars of postage revenue annually. The United States Postal Service (USPS) is authorized to regulate the manufacture and use of postage meters. For the past several years the United States Postal Service has been actively proposing a solution to the problem of inadequate postage meter security. The United States Postal Service is also trying to solve the problem that currently available postal meter indicia are susceptible to counterfeiting. The United States Postal Service plans to solve the above problems by decertifying mechanical meters and implementing the Information-Based Indicia Program (IBIP).

The IBIP is a United States Postal Service initiative supporting the development and implementation of a new form of postal indicia. The IBIP specification is intended to address the counterfeiting threat. An IBIP indicium substitutes for a postage stamp or as a postage meter imprint as evidence of the fact that postage has been paid on mail pieces. The Information-Based Indicia technology of the United States Postal Service offers the postal customer a way to pay for postage without stamps. Envelopes may be franked using the postal customer's personal computer, a personal computer compatible add on and the customer's printer. The PSD provides postal value storage and the link to the USPS and the manufacturer of the personal computer compatible add on.

The IBI should be able to be read at any time to verify that funds have is been paid. It is expected that it will be difficult to audit the franking process.

SUMMARY OF THE INVENTION

This invention overcomes the disadvantages of the prior art by providing a system that scans and reads an Information-Based Indicia (IBI) that is affixed to a mail piece in accordance with the USPS Specification. This invention also improves both the readability and security of the IBI. If the scanned IBI is not the IBI that the meter intended to be printed, or if the IBI contains incorrect information, or if the IBI is fraudulent, then the meter will print additional material "over, or as part of the IBI". The additional material may be the word "void" and/or other coded material. The additional material may be printed with an ink that is visible or invisible to the human eye. If, the scanned IBI is the IBI that the meter intended to be printed, then the meter will print additional material "over, or as part of the IBI". The additional material may be a bar code that is printed with an ink that is invisible to the human eye. The additional information may be information that the post and/or postage meter manufacturer and/or post would like to be known, i.e., does the postage meter require maintenance, has the readability of the IBI been degraded, etc. . . .

When the mail piece arrives at the post, the additional material is scanned and read at the same time the IBI information is scanned and read. The scanned verification information is then collected and may be subsequently transmitted to a central data center and used for further verification of the postage paid. This stored information may be retrieved during connection to a central postage meter resetting data center when the meter is reloaded and forensically checked. An example of a central postage meter resetting data center is set forth in Eckert's U.S. Pat. No. 3,596,247 entitled "Automatic Register Setting Apparatus", dated Jul. 27, 1971, herein incorporated by reference. The secure message may also be transmitted to a data center at any time to correlate the hidden secure message and the encrypted message in the IBI. The data center may also determine if sufficient funds are in the meter to pay for the postage. The data center can also determine whether or not the meter has been tampered with and if the meter is functioning properly. The data center can use the additional information printed on the IBI to provide additional security and/or determine how the meter is functioning. Thus, additional information may be written over the IBI and read without modifying the visible IBI.

DETAILED DESCRIPTION OF THE PREFERRED EMBODIMENT

Figure 1:
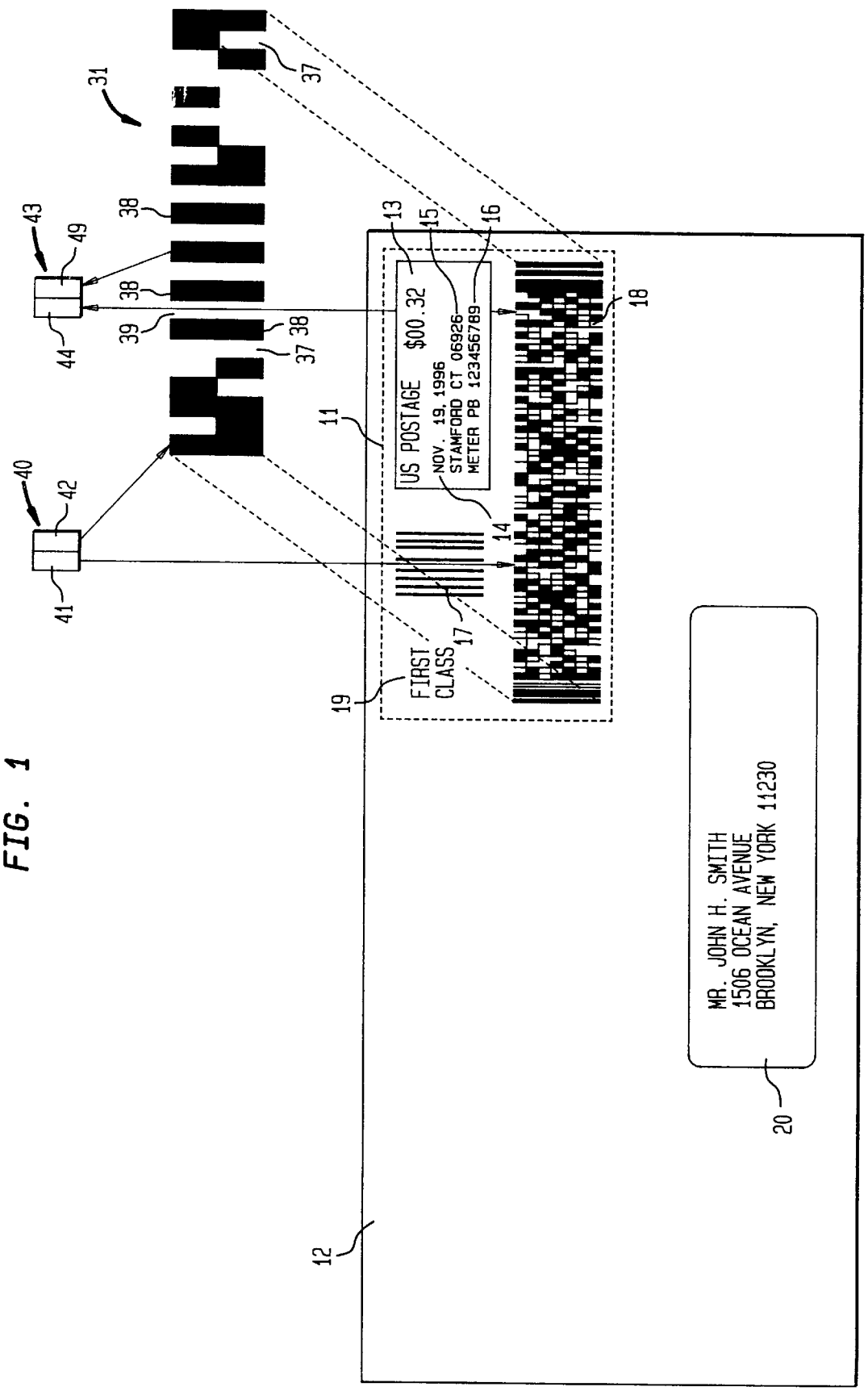
FIG. 1 is a drawing of a bar code printed on top of a mail piece containing Information-Based Indicia.

Referring now to the drawings in detail, and more particularly to FIG. 1, the reference character 11 represents a USPS Information-Based Indicia that was printed on mail piece 12 by a printer (not shown). The postal indicia 11 contains a dollar amount 13, the date 14 that the postal indicia was affixed to the mail piece, the place the mail piece was mailed from 15, the postal meter serial number 16, a FIM code 17 and a 2D encrypted bar code 18. Mail piece 12 also contains an indication 19 of the class of mail piece 12. Mail piece 12 is going to be sent to the person and place indicated in address field 20.

An upper layer bar code 31 is printed over lower layer. It will be obvious to one skilled in the art that bar code 31 may contain additional information that increases the security of Information-Based Indicia 11 and/or contains information that the postage meter manufacture and/or post would like to know, i.e., does the postage meter require maintenance, has the readability of Information-Based Indicia 11 been degraded, etc. Bar code 31 is printed with an invisible ink. Bar code 31 has a data tract 33 and a clock track 34. A dark bar 36 or space containing ink would indicate a binary one in the data track and an empty space 37 or space containing no ink would indicate a zero in the data track. A dark bar 38 or space containing ink would indicate a binary one in the clock track and an empty space or space containing no ink would indicate a binary zero in the clock track.

Thus, in the same amount of space on mail piece 12, that would be utilized by the prior art to print one bar code, this invention prints two or more bar codes. Hence, more than double the amount of information may be printed in the same space. It will be obvious to one skilled in the art that bar code 31 may be a two dimensional encrypted bar code.

The inks that are used to print Information-Based Indicia 11 and 31 may be applied using conventional printing methods i.e. ink jet, dot matrix, impact, etc. The inks used to print Information-Based Indicia 11 and bar code 31 are similar and may have similar reflection wavelengths to the emission wavelength of the ink used to print bar code 31. The ink that is used to print bar code 31 is invisible to the naked eye and can be excited by ultra violet light. Examples of the ink that is used to print bar code 31 is based on organic complexes of rare earth elements ions (lanthanides), such as: europium, gadolinium and terbium dipicolinates. An example of an ink that is used to print bar code 31 is set forth in the Auslander et al. U.S. Pat. No. 5,542,971 entitled "Bar Codes Using Luminescent Invisible Inks", dated Aug. 6, 1996, herein incorporated by reference.

The UV fluorescent pigment was chosen such that the emission wavelength is the same or close to the color of the visible printing so that the same detector systems can be used to detect the visible and invisible printings. An additional practical feature of the fluorescent emission of the invisible ink is selected such that it is at least 50 nm longer than the ½ width wavelength of the fluorescent brightners used in envelope paper stock. This enables discrimination of the bar code signal from the envelope background. The invisible bar code 31 gives improved signal to noise and readability over conventional visible bar codes due to the optical characteristics of emitted light over reflected light. It will be obvious to one skilled in the art that bar code 31 may be a 1d bar code, another type of bar code or another code. The signal from a conventional visible bar code is subject to degradation due to irregularity in the paper surface topography from the paper itself as well as the contents of an envelope.

The ink that is used to print Information-Based Indicia 11 and address field 20 is a conventional ink which absorbs in the visible range of the spectrum between (400–700 nm) and has a print contrast signal with a back ground of more than 0.4. An example of the above ink is an black ink that is currently being used in an ink jet printer, i.e., the desk jet printer manufactured by Hewlett Packard.

The information contained in Information-Based Indicia 11, address field 20 and bar code 31 may be read within postage meter 50 by utilizing light sources 40. Light source 40 comprises: light sources 41 and 42. Light sources 41 and 42 have different wavelengths. Source 41 is utilized to illuminated Information-Based Indicia 11, address field 20 and source 42 is used to excite bar code 31. Source 41 is a lamp emitting light having a wavelength between 400 and 700 nm and source 42 is a ultraviolet source that emits light between 200–400 nm. Scanner 43 comprises a scanner 44 and a scanner 45. Scanner 44 is utilized to sense Information-Based Indicia 11 and address field 20 and scanner 45 is utilized to sense bar code 31.

Scanner 44 senses the reflected light from Information-Based Indicia 11 and scanner 45 senses the emitted light from bar code 31. Scanner 45 may be a photo diode or photo transistor.

Figure 2:
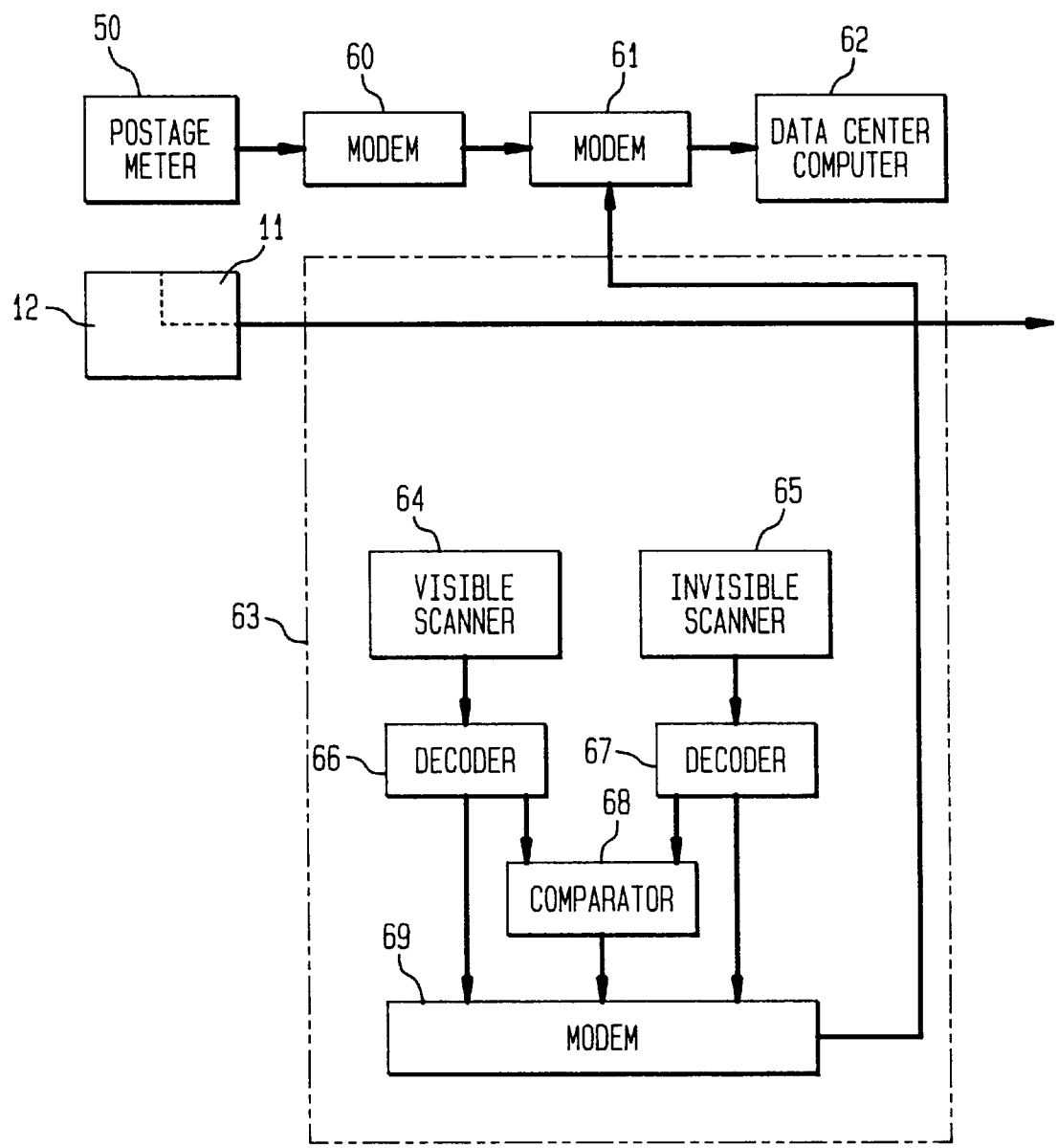
FIG. 2 is a drawing showing mail having a Information-Based Indicia being read at the post and information contained in the Indicia being transmitted to a data center.

FIG. 2 is a drawing showing mail having a Information-Based Indicia being read at the post and information contained in the Indicia being transmitted to a data center. Postage meter 50 (shown in detail in FIG. 2 of copending patent application Docket No. E-589) affixes Information-Based Indicia 11 to mail piece 12. Postage meter 50 is coupled to modem 60 and modem 60 is coupled to modem 61. Modem 61 is coupled to data center computer 62. During a refill of meter 50, meter 50 will transmit information contained in the hidden secure message and the encrypted message in Information-Based Indicia 11 and/or bar code 31 to data center computer 62 via modems 60 and 61. The aforementioned information may include the serial number of meter 50, the amount of funds in meter 50 when Information-Based Indicia 11 was affixed to mail piece 12, the addressee of mail piece 12, the amount of postage affixed to mail piece 12, etc. The manner in which a postage meter is refilled is described in Eckert's U.S. Pat. No. 3,596,247 entitled "Automatic Register Setting Apparatus", dated Jul. 27, 1971, herein incorporated by reference.

When mail piece 12 arrives at post 63, Information-Based Indicia 11 is scanned by visible scanner 64 and invisible scanner 65. Scanner 64 detects information contained in, Information-Based Indicia 11 and scanner 65 detects information contained in bar code 31. Scanner 64 is coupled to decoder 66 and scanner 65 is coupled to decoder 67. Decoder 66 is coupled to comparator 68 and modem 69 and decoder 67 is coupled to comparator 68 and modem 69. Modem 69 is coupled to modem 61. Decoder 66 will decoded the information scanned by scanner 64 and decoder 67 will decoded the information scanned by scanner 65. Comparator 68 will compare the outputs of decoder 66 and decoder 67. If, the outputs of decoders 66 and 67 differ, comparator 68 will transmit this fact to data center computer 62 via modems 69 and 61. Decoder 66 is coupled to modem 69 and decoder 67 is coupled to modem 69. The information decoded by decoders 66 and 69 will be transmitted to data center computer 62 via modems 69 and 61. Computer 62 will store the foregoing information and compare the stored information to the information transmitted to computer 62 by postage meter 50 during a refill. Computer 62 will also obtain and store the additional information contained in invisible bar code 31 (FIG. 1).

Figure 3:
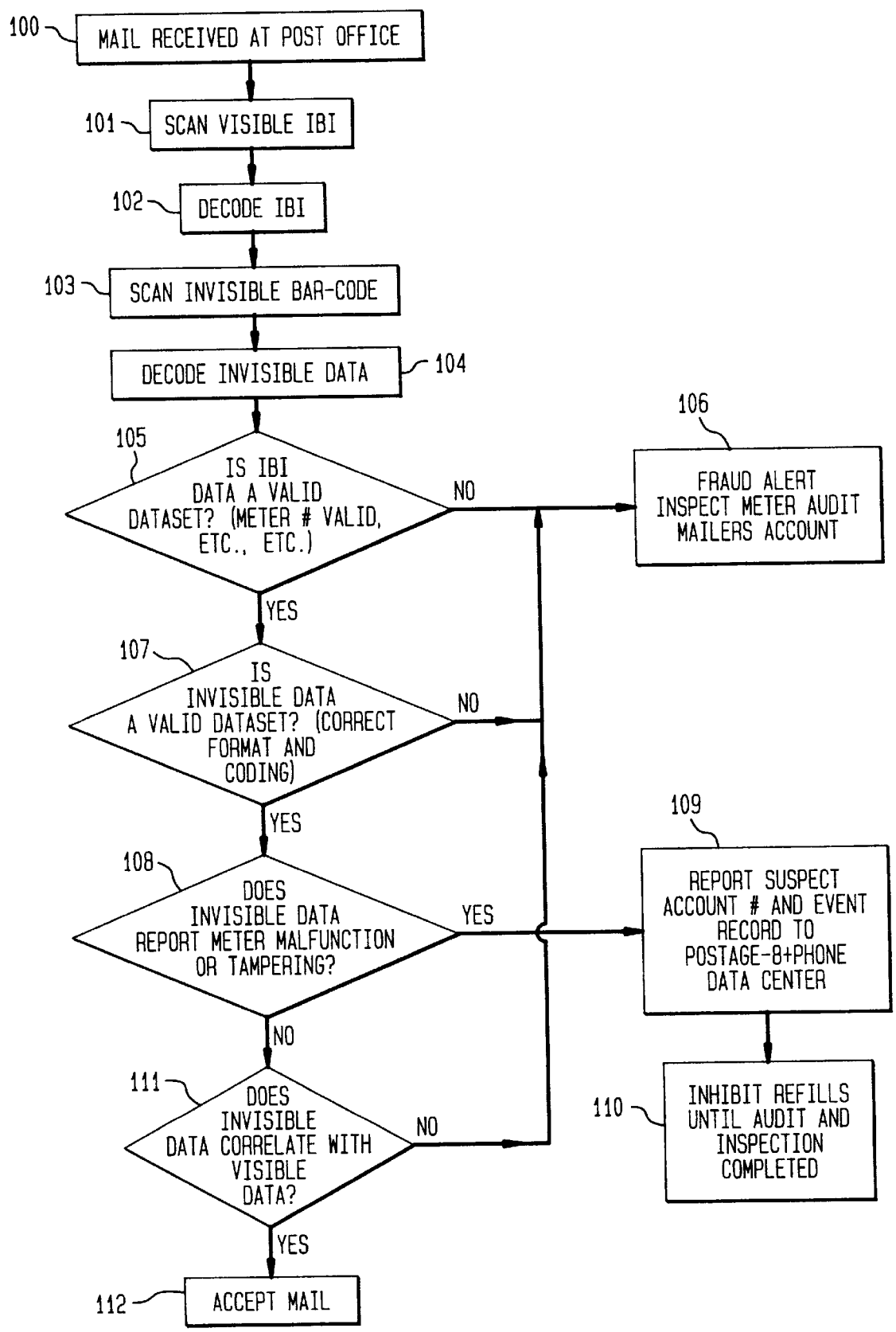
FIG. 3 is a drawing of a flow chart showing the verification of metered mail at the post office.

FIG. 3 is a drawing of a flow chart showing the verification of metered mail at the post office. The program begins in block 100 when mail piece 12 is received at the post office. Then in block 101 visible Information-Based Indicia 11 will be scanned and in block 102 the information contained in indicia 11 will be decoded. At this point in block 103 invisible bar code 31 will be scanned. Then in block 104 the information contained in invisible bar code 31 will be decoded.

The program will proceed to decision block 105. Decision block 105 determines whether or not the information contained in indicia 11 is a valid data set, i.e., was the serial number of the meter that printed or allowed the printing of indicia 11 a valid meter serial number, etc. If, block 105 determines that the information contained in indicia 11 is not a valid data set, then the program will go to block 106 to alert the fraud bureau. The fraud bureau may then inspect the meter that affixed indicia 11 and/or audit the account of the mailer. If, block 105 determines that the information contained in indicia 11 is a valid data set, then the program will go to decision block 107.

Decision block 107 determines whether or not the information contained in invisible bar code 31 is a valid data set, i.e., does code 31 have the correct format. If, block 107 determines that the information contained invisible bar code 31 is not a valid data set, then the program will go to block 106 to alert the fraud bureau. The fraud bureau may then inspect the meter that affixed indicia 11 and/or audit the account of the mailer. If, block 107 determines that the information contained in bar code 31 is a valid data set, then the program will go to decision block 108.

Decision block 108 determines whether or not the information contained in invisible bar code 31 indicates that the meter malfunctioned or was tampered with. If, block 108 determines that the meter malfunctioned or was tampered with, then the program will go to block 106 to alert the fraud bureau and block 109 to alert the data center. The fraud bureau may then inspect the meter that affixed indicia 11 and/or audit the account of the mailer. The data center will report the suspect account number and event record to the postage by phone data center. The postage by phone data center in block 110 may inhibit refills of the suspected malfunctioned or tampered meter until an audit and inspection of the meter is completed. If, block 108 determines that the meter did not malfunction or was not tampered with, then the program will go to decision block 111.

Decision block 111 determines whether or not the information contained in visible information based indicia 11 correlates with the information contained in invisible bar code 31. If, block 111 determines that the information contained in indicia 11 does not correlate with the information contained in invisible bar code 31, then the program will go to block 106 to alert the fraud bureau. The fraud bureau may then inspect the meter that affixed indicia 11 and/or audit the account of the mailer. If, block 111 determines that the information contained in bar code 31 correlates with the information contained in invisible bar code 31, then the program will go to block 112. In block 112 the mail will be continued to be processed and delivered.

The above specification describes a new and improved system for improving the readability and security of machine readable indicias. It is realized that the above description may indicate to those skilled in the art additional ways in which the principles of this invention may be used without departing from the spirit. It is, therefore, intended that this invention be limited only by the scope of the appended claims.

What is claimed is:

1. An improved metering system that affixes an indicia to a mail piece, the improvement comprising:

means for scanning and verifying the affixed indicia;

means for recording over the affixed indicia or in the vicinity of the indicia additional information that is invisible to the human eye; and means for transmitting the additional information to a data center for further processing.

2. The system claimed in claim 1, further including:

means for delivering the mail piece to the post;

means at the post for scanning the additional information;

means for transmitting the scanned information at the post to the data center; and means at the data center for comparing the additional information transmitted by the metering system with the additional information scanned at the post.

3. The system claimed in claim 1, wherein the additional information is in the form of a bar code.

4. The system claimed in claim 1, wherein the affixed indicia is an Information-Based Indicia.

5. The system claimed in claim 1, wherein the additional information comprises: information pertaining to the operation of the metering system.

6. The system claimed in claim 1, wherein the additional information comprises: information pertaining to the maintenance of the metering system.

7. An improved metering system that stores postal information and affixes an Information-Based Indicia to a mail piece to indicate that postage has been paid, the improvement comprising:

means for scanning the affixed Indicia;

means coupled to said scanning means for verifying that the information contained in the Indicia corresponds to the postal information stored in the metering system; and means for recording over the affixed indicia or in the vicinity of the indicia additional information; and means for transmitting the additional information to a data center for further processing.

8. The system claimed in claim 7, wherein the additional information is invisible to the human eye.

9. The system claimed in claim 7, further including:

means for delivering the mail piece to the post;

means at the post for scanning the additional information;

means for transmitting the scanned information at the post to the data center; and means at the data center for comparing the additional information transmitted by the metering system with the additional information scanned at the post.

10. The system claimed in claim 7, wherein the additional information is in the form of a bar code.

11. The system claimed in claim 7, wherein the additional information comprises: information pertaining to the operation of the metering system.

12. The system claimed in claim 7, wherein the additional information comprises: information pertaining to the maintenance of the metering system.

* * * * *